United States Patent
Silverstein et al.

(10) Patent No.: US 11,290,536 B2
(45) Date of Patent: Mar. 29, 2022

(54) UPDATING AUTOMATED COMMUNICATION REPLIES BASED ON DETECTED SITUATIONS

(71) Applicant: International Business Machines Corporation, Armonk, NY (US)

(72) Inventors: Zachary A. Silverstein, Jacksonville, FL (US); Robert Huntington Grant, Marietta, GA (US); Jeremy R. Fox, Georgetown, TX (US); Heather Omsberg, Watertown, MA (US)

(73) Assignee: International Business Machines Corporation, Armonk, NY (US)

( * ) Notice: Subject to any disclaimer, the term of this patent is extended or adjusted under 35 U.S.C. 154(b) by 37 days.

(21) Appl. No.: 16/687,992

(22) Filed: Nov. 19, 2019

(65) Prior Publication Data
US 2021/0152640 A1   May 20, 2021

(51) Int. Cl.
| | |
|---|---|
| *H04L 67/12* | (2022.01) |
| *G06F 3/16* | (2006.01) |
| *G10L 15/22* | (2006.01) |
| *G10L 15/26* | (2006.01) |
| *H04L 67/51* | (2022.01) |
| *H04W 4/70* | (2018.01) |
| *G06N 20/00* | (2019.01) |
| *H04L 67/306* | (2022.01) |
| *H04L 67/125* | (2022.01) |

(52) U.S. Cl.
CPC .............. *H04L 67/12* (2013.01); *G06F 3/167* (2013.01); *G10L 15/22* (2013.01); *G10L 15/26* (2013.01); *H04L 67/16* (2013.01); *H04W 4/70* (2018.02); *G10L 2015/223* (2013.01)

(58) Field of Classification Search
CPC ....... H04L 67/12; H04L 67/16; H04L 67/306; H04L 67/125; G10L 15/22; G10L 15/26; G10L 2015/223; H04W 4/70; G06F 3/167
See application file for complete search history.

(56) References Cited

U.S. PATENT DOCUMENTS

| | | | |
|---|---|---|---|
| 10,258,295 | B2 | 4/2019 | Fountaine |
| 2017/0068994 | A1 | 3/2017 | Slomkowski |
| 2017/0084295 | A1 | 3/2017 | Tsiartas |
| 2017/0162197 | A1* | 6/2017 | Cohen ................. G06F 3/012 |
| 2018/0101776 | A1* | 4/2018 | Osotio ................. G06N 5/04 |

(Continued)

FOREIGN PATENT DOCUMENTS

WO    2007024704 A2    5/2008

OTHER PUBLICATIONS

"IPsoft Amelia—The Science Behind Her Brain," IPsoft.com, printed Aug. 21, 2019, 3 pages. <https://www.ipsoft.com/amelia-science/>.

(Continued)

*Primary Examiner* — Ario Etienne
*Assistant Examiner* — Kamal Hossain
(74) *Attorney, Agent, or Firm* — Brian D. Welle

(57) ABSTRACT

Data related to a user is gathered from a plurality of Internet of things (IoT) devices. A situation is identified using the data related to the user. The situation indicates language preferences. A prompt is received from the user and within the situation. A reply is provided to the user according to the language preferences in response to the prompt being received within the situation.

16 Claims, 3 Drawing Sheets

(56) References Cited

U.S. PATENT DOCUMENTS

| | | |
|---|---|---|
| 2018/0240454 A1 | 8/2018 | Raj |
| 2018/0308473 A1 | 10/2018 | Scholar |
| 2019/0028587 A1 | 1/2019 | Unitt |
| 2019/0141190 A1 | 5/2019 | Gupta |
| 2019/0266999 A1* | 8/2019 | Chandrasekaran ...... G09B 5/00 |

OTHER PUBLICATIONS

Gupta et al., "Staying on brand: How to humanize virtual agents, just enough," IBM RegTech Innovations Blog, Feb. 12, 2018, 3 pages, <https://www.ibm.com/blogs/insights-on-business/banking/staying-on-brand-how-to-humanize-virtual-agents-just-enough/>.

Nijholt, "All the World's a Stage: Incongruity Humour Revisited," Annals of Mathematics and Artificial Intelligence, Dec. 12, 2018, 34 pages, <https://www.researchgate.net/publication/329588227_All_the_World's_a_Stage_Incongruity_Humour_Revisited>.

* cited by examiner

UPDATING AUTOMATED COMMUNICATION REPLIES BASED ON DETECTED SITUATIONS

BACKGROUND

Many artificial intelligence (AI) computing systems are designed to respond to prompts from a user. For example, the AI computing system may be configured to understand a verbal or written question or prompt from a user and respond accordingly. These prompts may relate to home automation tasks, such as turning an appliance on or changing a situation on an appliance or the like. In some examples, the prompts may be queries from the user that the user is requesting that the AI computing system answer. In such examples, the AI computing system may provide a verbal or text response to the user in a natural language format.

SUMMARY

Aspects of the present disclosure relate to a method, system, and computer program product relating to updating computer-provided communication depending upon a detected situation. For example, the method may include gathering data related to a user from a plurality of Internet of things (IoT) devices. The method may further include identifying a situation using the data related to the user. The situation indicates language preferences. The method may further include receiving a prompt from the user within the situation. The method may further include providing a reply to the user according to the language preferences in response to the prompt being received within the situation. A system and computer product configured to perform the above method are also disclosed.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
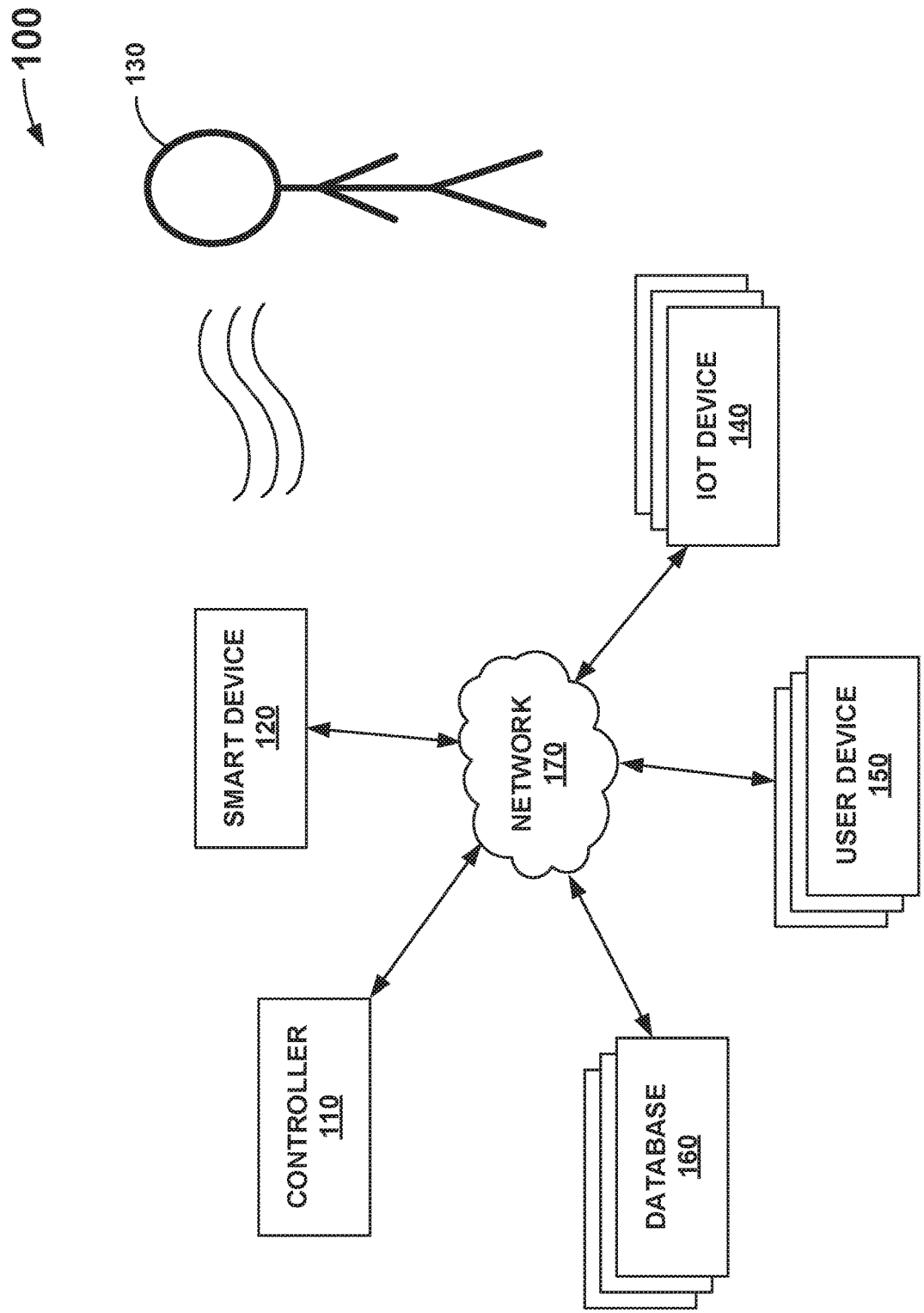
FIG. 1 depicts a conceptual diagram of an example system in which a controller may update computer-provided communication depending upon a detected situation.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to generating replies to user prompts, while more particular aspects of the present disclosure relate to generating replies to these prompts according to different language preferences based on a situation of the user. While the present disclosure is not necessarily limited to such applications, various aspects of the disclosure may be appreciated through a discussion of various examples using this context.

Artificially intelligent (AI) smart devices and smart systems (hereinafter referred to as smart devices) may be configured to respond to user requests, commands, questions, or the like. For example, a smart device may automate the functionality of Internet of Things (IoT) devices of a home network in response to a user request. For another example, a smart device may respond to a general question, such as a question relating to the weather or the like. The functionality of such smart devices is rapidly growing, particularly as IoT devices themselves becomes more common and powerful.

Smart devices often have relatively sophisticated natural language processing (NLP) capabilities, such that these devices are configured to understand and provide responses of varying amounts of complexity and nuance. In some conventional designs, smart devices may be configured to provide answers and information in a descriptive and objective manner. These conventional systems may be configured to provide answers in a manner that would be appropriate for the majority of situations.

However, the manner in which a user may want a reply may change based on a different situation. For example, if a user is in a lighthearted mood with more free time, the user may desire and/or appreciate an answer that provides more details with relatively more grandiloquence (e.g., more adjectives, more adverbs, with more poetic structure). For another example, if a user is busy, late, or the like, the user may instead desire a response that is succinct. For another example, if a user appears to be particularly engrossed in a situation, the user may appreciate relatively more details in a reply to a prompt about that situation. Conventional systems may lack an ability to provide responses with different language preferences, much less detect what these preferences may be.

Aspects of the disclosure relate to providing individualized responses that are tailored to the situation of a user via the incorporation of different language preferences. A computing system that includes a processor that executes instructions stored on a memory (this computing system hereinafter referred to as a controller) may detect these situations and/or provide these replies. This controller may be integrated into and/or otherwise control some functionality of one of the smart devices described herein. The controller may detect a plurality of different types of situations, and, in response to these detected situations, provide different language modifications. Further, the controller may be configured to detect user responses and improve at providing these customized responses over time using machine learning techniques as described herein. In this way, aspects of the disclosure may be configured to improve an ability of a computing system to detect a situation of a user and tailor a reply to a prompt from this user based on this situation.

For example, FIG. 1 depicts system 100 in which controller 110 enables smart device 120 to determine a situation of and/or generate replies for user 130. In some examples, controller 110 may require an opt-in from user 130 prior to determining a situation of user 130. In certain examples, controller 110 may gather a respective opt-in for many or all different manners in which controller 110 may identify a situation of user 130, such as from gathering data from IoT devices 140 and/or user devices 150 as described herein.

Figure 2:
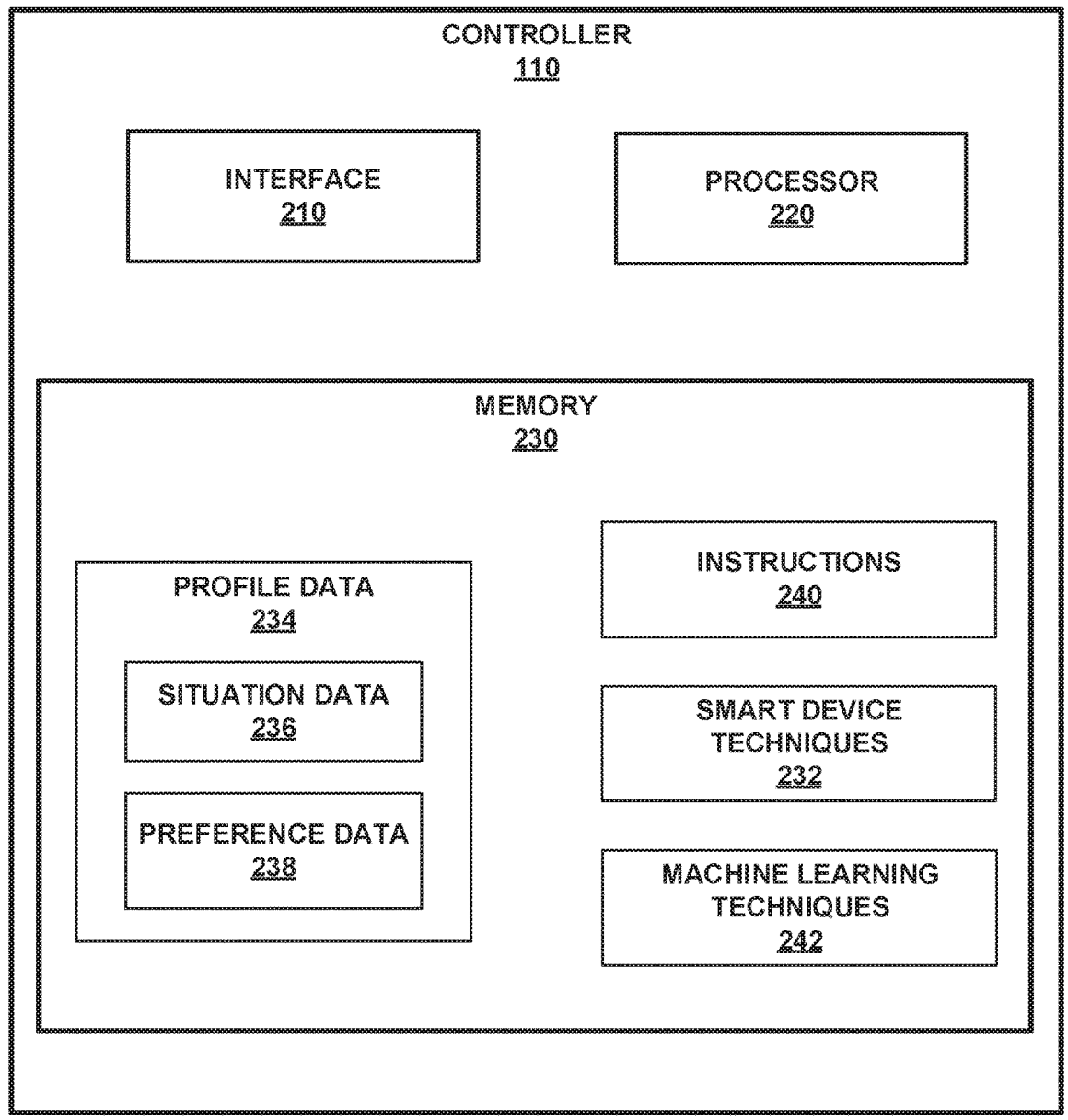
FIG. 2 depicts a conceptual box diagram of example components of the controller of FIG. 1.

Controller 110 may include a computing device, such as computing device 200 of FIG. 2 that includes a processor communicatively coupled to a memory that includes instructions that, when executed by the processor, causes controller 110 to execute one or more operations described below. As described above, smart device 120 may include an artificial intelligence (AI) response device that is configured to intelligently respond to prompts. Though, for purposes of clarity, controller 110 is depicted as a separate device from smart device 120, in other examples, controller 110 may be integrated into smart device 120 or vice versa.

Smart device 120 may respond to prompts from user 130. In some examples, only a predetermined set of people may be identified as users 130 as defined herein, such as people that are living in the home where smart device 120 is located. In other examples, users 130 may include substantially anyone that is in a communication range of smart device 120. This communication range may include a range in which smart device 120 can detect a voice of user 130. In other examples, smart device 120 may include an online resource (e.g., such as an online search engine, chatbot, question-answer system, or the like), such that user 130 may provide a prompt to (and receive a reply from) smart device 120 from any computing device such as user device 150. User devices 150 may include computing devices (e.g., devices similar to computing device 200 of FIG. 2) such as mobile phones, tablets, laptops, or the like.

Prompts from users 130 as used herein include questions to which user 130 is expecting an answer from smart device 120. These prompts may relate to substantially any subject. For example, smart device 120 may utilize question-answering techniques and information from one or more online databases 160 hosted on the Internet to answer questions from user 130. Additionally, or alternatively, smart device 120 may utilize data from user devices 150 (e.g., such as calendar data, location data, communication data) and/or data from IoT devices 140 to answer questions. IoT devices 140 may include a plurality of computing devices, security systems, home appliances, or the like. For example, IoT devices 140 may include televisions, security cameras, kitchen appliances, heating ventilation and cooling (HVAC) appliances, speakers, webcams, or the like. As such, smart device 120 may answer questions relating to data that is sensed, gathered, stored, or the like on one or more IoT devices 140 and/or user devices 150.

Smart device 120 may access IoT devices 140 over network 170. Network 170 may include a computing network over which computing messages may be sent and/or received. For example, network 170 may include the Internet, a local area network (LAN), a wide area network (WAN), a wireless network such as a wireless LAN (WLAN), or the like. Network 170 may comprise copper transmission cables, optical transmission fibers, wireless transmission, routers, firewalls, switches, gateway computers and/or edge servers. A network adapter card or network interface in each computing/processing device (e.g., controller 110, smart device 120, IoT devices 140, user devices 150, and or databases 160) may receive messages and/or instructions from and/or through network 170 and forward the messages and/or instructions for storage or execution or the like to a respective memory or processor of the respective computing/processing device. Though network 170 is depicted as a single entity in FIG. 1 for purposes of illustration, in other examples network 170 may include a plurality of private and/or public networks.

Controller 110 may identify a situation of user 130. For example, controller 110 may identify a location of user 130 (e.g., at work, at home, outside, in an entryway, in a living room, etc.), an activity of user 130 (e.g., working, watching television, reading, exercising), an emotional state of user 130 (e.g., stressed, happy, upset, hurried, etc.), or the like. Controller 110 may identify this situation using IoT devices.

For example, controller 110 may gather biometric data of user 130 from one or more wearable biometric IoT devices 140 being worn by user 130. For another example, controller 110 may gather visual data (e.g., an emotional expression of user 130, or an activity of user 130) from one or more camera IoT devices 140, or audio data (e.g., laughter from user 130, or stressed expressions from user 130) from one or more microphone IoT devices 140. In other examples, controller 110 may identify an activity of user 130 based on one or more IoT devices 140 being utilized by user 130. For example, controller 110 may identify that television IoT device 140 is currently streaming a television show, in response to which controller 110 determines that user 130 is watching television. For another example, controller 110 may identify that an e-book reader IoT device 140 is currently turned on, such that user 130 is reading. Controller 110 may further identify the specific media being consumed by user 130 as applicable.

Further, controller 110 may gather data on a situation of user 130 from one or more user devices 150. For example, controller 110 may identify a location of user 130 from a global positioning system (GPS) functionality of user device 150. For another example, controller 110 may identify a schedule of user 130 from a calendar of use as stored on user device 150. In some examples, controller 110 may gather communication data from user 130 (e.g., recent text messages or the like) as was conducted over user device 150. Once controller 110 identifies a situation of user 130, controller 110 may save this situation in database 160, which may be a computing device (e.g., similar to computing device 200 of FIG. 2) such as a server or rack of servers or the like.

Controller 110 may identify a profile from the gathered data. For example, initially controller 110 may detect an unidentified user watching television on IoT device 140. In response to this, controller 110 may identify user 130 by identifying a profile of user 130. Profiles of respective users 130 may be stored on database 160. The profiles may include a name of user 130, a voice sample of user 130, a face of user 130, one or more user devices 150 associated with user 130, or the like.

Controller 110 may identify language preferences associated with user 130 in this situation. One or more or each language preference may be stored as a modifier, such that controller 110 may cause a conventional reply as identified by smart device 120 to be modified according to the set of language preferences for the user according to the situation and/or the user profile. For example, controller 110 may utilize identified language preferences to determine weighted scores for each of a number of factors, such as details, length, grandiloquence, or the like. Controller 110 may therein "run" the conventional reply through a modification engine that modifies each of the preferences according to their weighted score, modifying relatively more for details, less for length, or the like.

For example, controller 110 may identify that user 130 is in a hurry trying to get ready and go out the door, such that user 130 wants short replies with minimal grandiloquence but also as many details as possible. As such, in response to a prompt, "what is the weather like," controller 110 may cause smart device 120 to give a reply, "75°, cloudy, very windy, zero chance of rain."

For another example, controller 110 may identify that a user is watching a documentary about gazelles in a nature preserve and their life afterwards from a microphone IoT device 140 and television IoT device 140. From a camera IoT device 140, controller 110 may identify that a user is very engaged by the documentary (e.g., by tracking a visual gaze of user 130 and/or by identifying an interested facial expression of user 130). Further, controller 110 may analyze the documentary using one or more natural language processing techniques to identify that the tone of the documentary is optimistic and hopeful, and that the presentation (e.g., the color palette) is warm and soothing. Controller 110 may further identify that user 130 has paused the documentary a few times to look up extra details about the subject matter, indicating a high level of interest in the subject matter as well as a relatively large amount of free time. In response to this, controller 110 may identify that user 130 currently has language preferences of a relatively large amount of each of detail, grandiloquence, and length.

If, while still within this situation (e.g., such that user 130 has not changed what user 130 is watching or otherwise exhibited countering emotional states), user 130 provides a prompt, controller 110 may modify a "standard" response from smart device 120 using this modification engine to increase an amount of detail, grandiloquence, and/or length. In some examples, if a situation changes, controller 110 may slowly change the weighted values over time rather than immediately re-calculating them. For example, if user 130 receives a business call on user device 150 during the documentary described above, therein acting differently during this phone call than while watching the documentary, controller 110 may slowly drop a grandiloquence weight grade over time to match a changing mode. A rate at which a modification engine changes weighted grades over time may depend upon different situations and/or different users 130 (e.g., such that some situations may change language preferences of most users relatively more quickly, and/or some users may change their own language preferences relatively more quickly than other users).

Further, once this reply is provided, controller 110 may determine an extent to which user 130 was satisfied with this modified reply and update the modification engine accordingly, therein learning how to improve at providing replies according to language preferences over time. For example, controller 110 may directly receive feedback from user 130. User 130 may provide feedback by indicating (e.g., indicating on a user interface of user device 150) that user 130 liked or did not like a reply provided by smart device 120, or like some parts (e.g., the detail) but did not like other parts (e.g., the length).

Alternatively, or additionally, controller 110 may monitor user 130 to determine whether or not user 130 liked the reply provided according to language preferences. For example, if controller 110 causes smart device 120 to provide a reply that is relatively long (e.g., twenty words), and user 130 cuts off (e.g., speaks over) smart device 120 or appears to stop paying attention to smart device 120, controller 110 may identify that the determined "length" language preference was set with too high/strong of a weighted score for this situation, and/or this user profile. Alternatively, if controller 110 detects that user 130 laughs, smiles, or the like following the reply provided by smart device 120 according to language preferences, controller 110 may determine that this weighted score was appropriate.

In some examples, language preferences may relate to each user 130, such that different users 130 may have different language preferences for the same situations. In other examples, some or all users 130 may have similar or identical language preferences for the same situations. In examples where language preferences are unique to users 130, controller 110 may average language preferences for some or all users 130 in database 160 available to controller 110. In these examples, if controller 110 detects a situation for user 130 that controller 110 has never detected in relation to this respective user 130, controller 110 may "crowdsource" language preferences from database 160. Database 160 may store weighted scores for different situations, where some or all data as gathered by IoT device 140 and/or user device 150 is stored as a weighted variable itself. In this way, controller 110 may be configured to provide replies for users 130 during the very first time that users 130 are in a situation as monitored by controller 110.

As described above, controller 110 may include computing device 200 with a processor configured to execute instructions stored on a memory to execute the techniques described herein. For example, FIG. 2 is a conceptual box diagram of such computing device 200 of controller 110. While controller 110 is depicted as a single entity (e.g., within a single housing) for the purposes of illustration, in other examples, controller 110 may include two or more discrete physical systems (e.g., within two or more discrete housings). Controller 110 may include interfaces 210, processor 220, and memory 230. Controller 110 may include any number or amount of interface(s) 210, processor(s) 220, and/or memory(s) 230.

Controller 110 may include components that enable controller 110 to communicate with (e.g., send data to and receive and utilize data transmitted by) devices that are external to controller 110. For example, controller 110 may include interface 210 that is configured to enable controller 110 and components within controller 110 (e.g., such as processor 220) to communicate with entities external to controller 110. Specifically, interface 210 may be configured to enable components of controller 110 to communicate with smart device 120, IoT devices 140, user devices 150, databases 160, or the like. Interface 210 may include one or more network interface cards, such as Ethernet cards, and/or any other types of interface devices that can send and receive information. Any suitable number of interfaces may be used to perform the described functions according to particular needs.

As discussed herein, controller 110 may be configured to modify automated communication depending upon a detected situation. Controller 110 may utilize processor 220 to detect the situation and/or accordingly modify the communication. Processor 220 may include, for example, microprocessors, digital signal processors (DSPs), application specific integrated circuits (ASICs), field-programmable gate arrays (FPGAs), and/or equivalent discrete or integrated logic circuits. Two or more of processor 220 may be configured to work together to detect a situation and modify the communication accordingly.

Processor 220 may modify communication based on a detected situation according to instructions 240 stored on memory 230 of controller 110. Memory 230 may include a computer-readable storage medium or computer-readable storage device. In some examples, memory 230 may include one or more of a short-term memory or a long-term memory. Memory 230 may include, for example, random access memories (RAM), dynamic random-access memories (DRAM), static random-access memories (SRAM), magnetic hard discs, optical discs, floppy discs, flash memories, forms of electrically programmable memories (EPROM), electrically erasable and programmable memories (EEPROM), or the like. In some examples, processor 220 may modify generated communication as described herein according to instructions 240 of one or more applications (e.g., software applications) stored in memory 230 of controller 110. Further, instructions 240 may include the modification engine described above for modifying generic replies as created by smart device 120 according to weighted grades for length, detail, grandiloquence, or the like to satisfy language preferences.

In addition to instructions 240, in some examples gathered or predetermined data or techniques or the like as used by processor 220 to generate communication based on detected situations may be stored within memory 230. For example, memory 230 may include smart device techniques 232. Smart device techniques 232 may include the techniques with which smart device 120 operates as described above, such that controller 110 is configured to automate IoT devices 140 and respond to prompts as described herein. In some examples, memory 230 may include smart device techniques 232 as a result of smart device 120 and controller 110 being integrated into a single device.

Additionally, memory 230 may include information described above that may be stored in database 160, and/or memory 230 may include substantially all of database 160. For example, as depicted in FIG. 2, memory 230 may include profile data 234, which includes situation data 236 and preference data 238. Profile data 234 may include identifying features of a user, such as a voice profile of a user, a face of a user, or the like. In some examples, profile data 234 may include one or more user devices 150 that are associated with a user. Situation data 236 may include one or more situations within which language preferences of this user may change. For example, situation data 236 may include one or more locations, activities, emotional states, or the like. Situation data 236 may include the weighted grades for each of these detected variables, such as a 0.0-1.0 grade for variables such as facial expression, media tone, media content, biometric data, calendar activity, or the like.

Further, as described above, profile data 234 may further include preference data 238. Preference data 238 may include language preferences for respective users and respective situations. Preference data 238 may include a preferred amount of detail, a preferred amount of grandiloquence, and/or a preferred length of a reply. Preference data 238 may include a weighted grade for each of these variables, such as a grade between 0.0 and 1.0, for each of the detail, length, and/or grandiloquence for the given situation and/or given user profile. Though as depicted in some examples preference data 238 relates to a single profile (and therein a single user), in other examples one or more language preferences may be shared across users.

Memory 230 may further include machine learning techniques 242 that controller 110 may use to improve a process of modifying communication for language preferences as discussed herein over time. Machine learning techniques 242 can comprise algorithms or models that are generated by performing supervised, unsupervised, or semi-supervised training on a dataset, and subsequently applying the generated algorithm or model to modify communication for different situations according to preference data 238.

Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAD), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

Figure 3:
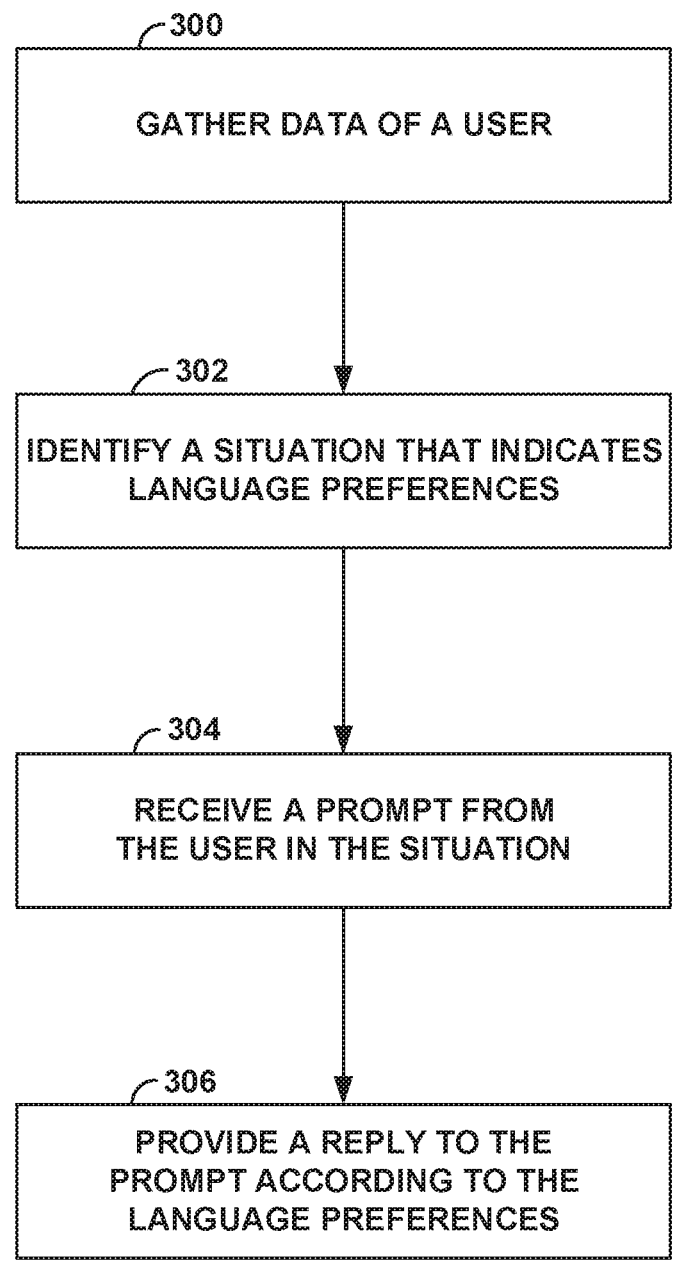
FIG. 3 depicts an example flowchart of updating computer-provided communication depending upon a detected situation.

Using these components, controller 110 may generate communication based on detected situations as discussed herein. For example, controller 110 may generate communication according to the flowchart depicted in FIG. 3. The flowchart of FIG. 3 is discussed with relation to FIG. 1 for purposes of illustration, though it is to be understood that other systems and data graphs may be used to execute the flowchart of FIG. 3 in other examples. Further, in some examples controller 110 may execute a different method than the flowchart of FIG. 3, or controller 110 may execute a similar method with more or less steps in a different order, or the like.

As depicted in FIG. 3, controller 110 may gather data of user 130 (300). Controller 110 may gather this data from one or more IoT devices 140. This data may include audio data, video data, biometric data, media usage, GPS data, or the like. In some examples, in gathering data of user 130 controller 110 may identify a user profile of user 130. Controller 110 may identify a user profile of user 130 by matching a facial profile to a visually identified face of user 130, matching a voice profile to an audibly detected voice of user 130, matching a detected user device 150 to user 130, or the like.

Controller 110 may use the gathered data to identify the situation (302). The situation may relate to a physical location or setting of user 130 (e.g., at home, at work, in nature), an activity of user 130 (e.g., reading, watching TV, exercising, getting ready to go outside), an emotional state of user 130 (e.g., relaxed, stressed, inquisitive, busy, curious), or the like. For example, controller 110 may identify that a nature documentary is playing on a smart television that the user is watching to identify a situation of "watching nature television." For another example, controller 110 may identify that user 130 is moving while maintaining a high heart rate, therein identifying a situation of "running" for user 130. Controller 110 may further identify weighted scores for each detected variable of the situation. For example, controller 110 may identify that, while television IoT device 140 is playing, that user 130 is engaging a mobile phone user device 150, such that an activity "watching television" is only a 0.5 on a 0.0 to 1.0 scale.

In some examples, the weighted grades that define the situation may apply to substantially all users 130 within the situation. In other examples, the weighted grades may be unique to one user 130 of many in a situation. For example, controller 110 may be configured to determine different language preferences for each user 130, such that the exact same situation may result in different weighted grades (and therein a different result after running a generic answer through a modification engine) for different users 130.

Alternatively, or additionally, some variables of a situation may also be unique to different users 130, such as emotional states of users 130. Controller 110 may use data from one or more IoT devices 140 and/or user devices 150 or the like to determine an emotional state of user 130. For example, controller 110 may identify that user 130 is relaxed as a result of a heartbeat from biometric watch IoT device 140, user 130 is stressed and/or busy as a result of this heartbeat and/or a calendar of cell phone user device 150 (e.g., where the calendar includes many upcoming meetings or due dates), or the like.

Controller 110 may identify a set of language preference for this situation and/or for a respective user 130. For example, controller 110 may identify that, while running, user 130 prefers short factual statements that are provided as succinctly as possible. For another example, controller 110 may identify that, while watching documentaries, user 130 prefers answers that are related to the documentary to be relatively longer and relatively more grandiloquent with a relatively greater amount of detail. For another example, controller 110 may identify that, while watching documentaries, user 130 prefers answer that are not related to the documentary to be provided quickly and within minimal detail (but still with relatively more grandiloquence).

Controller 110 may receive a prompt from user 130 (304). The prompt may be received while the user is still in the detected situation (e.g., while the user is still running, or watching the documentary, or the like). In some examples, controller 110 may gather data of user 130 (300) and identify a profile and situation of user 130 (302) as described above in response to receiving this prompt. In other examples, controller 110 may be regularly or nearly constantly (e.g., once every thirty seconds, or once a minute) detecting current profiles and/or situations of nearby users 130 (and updating weighted grades accordingly), such that controller 110 is ready to generate responsive communication substantially immediately in response to receiving a prompt (e.g., rather than having to detect a situation and/or profile in response to the prompt).

In response to this received prompt, controller 110 may provide a reply to user 130 (306). This reply may be a verbal reply (e.g., as provided by smart device 120) or a textual reply (e.g., as sent to user device 150 of user 130) or the like. This reply may be provided according to the language preferences.

For example, controller 110 may increase or decrease a length of the reply, where the relates to the number of words within the reply and/or the amount of time it takes to communicate the reply. An example of a relatively longer reply may be "the current time is 5:00 o'clock PM Eastern Standard Time," while "five" is an example of a relatively shorter reply. For another example, controller 110 may increase or decrease a grandiloquence of the reply, where extra adjectives or more poetic structure may be used to increase a grandiloquence of the reply. For example, controller 110 may increase grandiloquence by providing a reply of, "the weather outside is a crisp 55° Fahrenheit with some hazy sunshine peeping through the clouds, and with some light wind coming from the southeast I recommend a scarf to keep the chill out," while providing a reply with relatively less grandiloquence of "it is partly cloudy and 55° but it feels like 45° with windchill." For another example, controller 110 may add in more or less details based on the language preferences. For example, continuing the time example, controller 110 may cause an additional detail of "it is 5:00 rather than 4:00 due to daylight savings" to be included based on the language preferences.

Controller 110 may be configured to provide different replies to different users 130 within that situation. For example, two users 130 may be watching a TV documentary as detected on IoT devices 140, but one of these two users 130 may be relatively stressed as identified by facial recognition (e.g., identifying that this user 130 has a furrowed brow) or the like. In response to this determination, controller 110 may, e.g., decrease a grandiloquence of replies for the stressed user 130, while maintaining a "standard" grandiloquence weighted score for the non-stressed user 130.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-situation data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    gathering data related to a first user from a plurality of Internet of things (IoT) devices;
    identifying, using the data related to the first user, a situation that relates to a topic and indicates a first set of language preferences unique to the first user, wherein the first user has more than a threshold amount of interest in the topic;
    receiving, from the first user and within the situation, a first prompt;
    determining that the first prompt relates to the topic;
    identifying a standard reply for the first prompt;
    responding to the first user with a first modified version of the standard reply in which an amount of detail and an amount of grandiloquence of the standard reply are modified according to weighted scores for both the amount of detail and the amount of grandiloquence that are determined via the first set of language preferences in response to the first prompt being received within the situation, wherein the first modified version of the standard reply includes relatively more detail and relatively more grandiloquence via more adjectives and adverbs provided in a more poetic structure than the standard reply in a manner that corresponds to the weighted scores reflecting that the first prompt was received in the situation and relates to the topic in which the first user has more than the threshold amount of interest;

gathering data related to a second user from the plurality of IoT devices;

identifying, using the data related to the second user, the situation, wherein the situation indicates a second set of language preferences unique to the second user;

receiving, from the second user and within the situation, a second prompt; and responding to the second user with a second modified version of the standard reply according to the second set of language preferences in response to the second prompt being received within the situation, wherein the second set of language preferences are different than the first set of language preferences such that the second modified version is different than the first modified version of the standard reply.

2. The computer-implemented method of claim 1, wherein responding to the first user with the first modified version of the standard reply according to the first set of language preferences includes changing a length of the standard reply according to weighted scores that are determined via the first set of language preferences.

3. The computer-implemented method of claim 1, wherein the situation includes a physical location.

4. The computer-implemented method of claim 1, wherein the situation includes an activity.

5. The computer-implemented method of claim 1, wherein the situation includes an emotional state of the first user.

6. The computer-implemented method of claim 1, wherein the first modified version of the standard reply is a verbal reply.

7. The computer-implemented method of claim 1, wherein the first modified version of the standard reply is a textual reply.

8. The computer-implemented method of claim 1, wherein the responding to the first user with the first modified version of the standard reply includes incorporating a first subset of the first set of language preferences, the computer-implemented method further comprising:

receiving, from the first user and within the situation, an additional prompt;

responding to the first user with an additional reply according to a second subset of the first set of language preferences in response to the additional prompt being received within the situation, wherein the second subset of the first set of language preferences are different than the first subset of the first set of language preferences.

9. A system comprising:
a processor; and
a memory in communication with the processor, the memory containing instructions that, when executed by the processor, cause the processor to:
gather data related to a first user from a plurality of Internet of things (IoT) devices;
identify, using the data related to the first user, a situation that relates to a topic and indicates a first set of language preferences unique to the first user, wherein the first user has more than a threshold amount of interest in the topic;
receive, from the first user and within the situation, a first prompt;
determining that the first prompt relates to the topic;
identifying a standard reply for the first prompt;
respond to the first user with a first modified version of the standard reply in which an amount of detail and an amount of grandiloquence of the standard reply are modified according to a first set of weighted scores for both the amount of detail and the amount of grandiloquence that are determined via the first set of language preferences in response to the first prompt being received within the situation, wherein the first modified reply includes relatively more detail and relatively more grandiloquence via more adjectives and adverbs provided in a more poetic structure than the standard reply in a manner that corresponds to the first set of weighted scores reflecting that the first prompt was received in the situation and relates to the topic in which the first user has more than the threshold amount of interest gather data related to a second user from the plurality of IoT devices;

identify, using the data related to the second user, the situation that indicates a second set of language preferences unique to the second user, wherein the second user has less than the threshold amount of interest in the topic;

receive, from the second user and within the situation, a second prompt that is substantially identical to the first prompt;

determine that the second prompt relates to the topic; and respond to the second user with a second modified version of the standard reply in which the amount of detail and the amount of grandiloquence of the standard reply are modified according to a second set of weighted scores for both the amount of detail and the amount of grandiloquence that are determined via the second set of language preferences in response to the second prompt being received within the situation, wherein the second modified reply does not include relatively more details than the standard reply related to the topic in response to determining that the second user has less than the threshold amount of interest in the topic.

10. The system of claim 9, wherein responding with the first modified version of the standard reply according to the first set of language preferences includes changing a length of the first modified version of the standard reply.

11. The system of claim 9, wherein the situation includes at least one of:
a physical location;
an activity; and
an emotional state of the first user.

12. The system of claim 9, wherein the first modified version of the standard reply is a verbal reply or a textual reply.

13. The system of claim 9, wherein:
and the situation is defined by a type of location and a type of activity and an emotional state of a respective user in the situation; and
the first modified reply includes relatively more detail and relatively more grandiloquence via more adjectives and adverbs provided in a more poetic structure than the standard reply.

14. A computer program product, the computer program product comprising a computer readable storage medium having program instructions embodied therewith, the program instructions executable by a computer to cause the computer to:

gather data related to a first user from a plurality of Internet of things (IoT) devices;

identify, using the data related to the first user, a situation that relates to a topic and indicates a first set of language preferences unique to the first user, wherein the first user has more than a threshold amount of interest in the topic;

receive, from the first user and within the situation, a first prompt;

determining that the first prompt relates to the topic;

identifying a standard reply for the first prompt;

respond to the first user with a first modified version of the standard reply in which an amount of detail and an amount of grandiloquence of the standard reply are modified according to weighted scores for both the amount of detail and the amount of grandiloquence that are determined via the first set of language preferences in response to the first prompt being received within the situation, wherein the first modified version of the standard reply includes relatively more detail and relatively more grandiloquence via more adjectives and adverbs provided in a more poetic structure than the standard reply in a manner that corresponds to the weighted scores reflecting that the first prompt was received in the situation and relates to the topic in which the first user has more than the threshold amount of interest;

gather data related to a second user from the plurality of IoT devices;

identify, using the data related to the second user, the situation, wherein the situation indicates a second set of language preferences unique to the second user;

receive, from the second user and within the situation, a second prompt; and respond to the second user with a second modified version of the standard reply according to the second set of language preferences in response to the second prompt being received within the situation, wherein the second set of language preferences are different than the first set of language preferences such that the second modified version is different than the first modified version of the standard reply.

15. The computer program product of claim 14, wherein the situation includes at least one of:

a physical location;

an activity; and an emotional state of the first user.

16. The computer program product of claim 14, wherein responding with the first modified version of the standard reply according to the first set of language preferences includes changing a length of the verbal standard reply according to weighted scores that are determined via the first set of language preferences.

* * * * *